Nov. 18, 1941.  C. G. VEINOTT  2,262,869
DELAYED-START ELECTRIC MOTOR
Filed Dec. 28, 1939
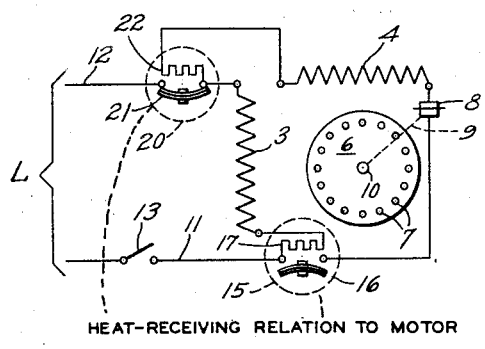
HEAT-RECEIVING RELATION TO MOTOR
WITNESSES:
C. J. Weller.
Wm. C. Groome
INVENTOR
Cyril G. Veinott.
BY O. B. Buchanan
ATTORNEY Patented Nov. 18, 1941

2,262,869

UNITED STATES PATENT OFFICE 2,262,869

DELAYED-START ELECTRIC MOTOR

Cyril G. Veinott, Lima, Ohio, assignor to Westinghouse Electric & Manufacturing Company, East Pittsburgh, Pa., a corporation of Pennsylvania Application December 28, 1939, Serial No. 311,333

8 Claims. (Cl. 172—279)

My invention relates, in general, to delayed motor-starting combinations in which a self-starting single-phase motor is energized for a more or less predetermined time, without starting, after which the nature of the energization is changed so that the motor will start. My invention was more particularly designed for a motor which is to drive a fan or blower, as a part of a so-called "unit" heater, particularly a unit heater of a type in which it is desirable to fire or energize the heat-radiator part at the same time that the electrical energy is applied to the motor, but in which it is desired that the motor shall not start to blow air through the heater until after the expiration of some time-delay, which may be of the order of 30 to 60 seconds, in order to allow the heater time to heat up, so that cold air will not be forced out by the heater, to the resultant discomfort of persons nearby.

A more specific object of my invention is to provide an electric motor which initially has its running-winding energized, and after a suitable time-delay, its starting-winding is subsequently energized in order to cause the motor to start.

Still more specifically, it is an object of my invention to provide a motor-mounted thermally responsive switch for accomplishing the above-stated objects, the thermally responsive switch being responsive to the initial temperature of the motor, as well as to the current through the main winding when the motor-rotor is locked or stationary.

A still further object of my invention is to provide a suitable protective switching means for a delayed-start motor of the class to which reference is made.

With the foregoing and other objects in view, my invention consists in the apparatus, combinations, methods and structure hereinafter described and claimed, and illustrated in the accompanying drawing, the single figure of which is a diagrammatic view of circuits and apparatus illustrating my invention in a preferred form of embodiment.

I have illustrated the invention as applying to a self-starting single-phase induction-motor having a main running-winding 3 and an auxiliary starting-winding 4, both of which are mounted on the primary member or stator of the motor. In the particular motor illustrated, the starting-winding 4 is of the split-phase type, but it may, in general, be of any type suitable for making a single-phase motor self-starting, being, in general, in substantially quadrature relation to the main winding 3, and its circuit being of such relative proportions of resistance and inductance that the starting-winding current is out of phase with the running-winding current. The motor is also provided with a rotor-member 6 which is illustrated as being of the squirrel-cage type, as indicated by the secondary winding 7, which may be understood as symbolic of any suitable polyaxially closed-circuited secondary windings. The motor is also provided with a centrifugal, or other speed-responsive, switch 8, having normally closed contacts in series with the starting-winding 4, said contacts 8 being adapted to open, in response to a predetermined speed, as diagrammatically indicated by the dotted-line connection 9 to the motor-shaft 10. The motor is also provided with a pair of single-phase line-terminals 11 and 12, which are adapted to have electrical energy applied thereto, as by means of the closure of a line-switch 13 in series with the line-terminal 11.

The illustrated means, which I have shown, for providing for the delayed-starting of the motor just described, is in the form of a thermally responsive switch 15, comprising a bimetallic switch-contact member 16 and also a heating-resistance 17 which is disposed in direct heat-transferring relation to the bimetallic switch 16. The bimetallic switch 16 is initially open, and is adapted, when it closes in response to a sufficient elevation in the temperature of the thermally responsive device 15, to energize the starting-winding 4, in series with its centrifugal switch 8, across the line-terminals 11. The heating resistance 17 of the thermally responsive device 15 is connected in series with the main running-winding 3 of the motor, in a circuit which is directly connected across the line-terminals 11 and 12, on the line-side of the bimetallic switch-contacts 16.

The thermally responsive switching-device 15 is also disposed or located in direct heat-exchanging relation to the motor, being usually mounted upon the stator member which carries the main and auxiliary windings 3 and 4, so that, when the motor is initially very cold, the time-delay in starting, necessary to heat the thermally responsive switching-device 15 to its critical temperature, will be longer than when the initial motor-temperature is somewhat higher, which is a most desirable feature, in unit-heater applications, where the time-delay necessary for bringing the heater itself up to a desired temperature is much shorter when the heater is initially warm than when the heater is initially cold.

The embodiment of my invention, as illustrated, also includes a protective time-delay circuit-interrupting means which I have illustrated in the form of a second thermally responsive switching-device 20 which is also mounted in direct heat-transferring relation to the motor, and specifically in direct heat-transferring relation to the stator member which carries the primary windings 3 and 4. The protective thermally responsive device 20 comprises a bimetallic contact-strip or disc 21 having contacts which are initially closed and which open in response to a predetermined critical temperature, and a heating-resistance 22 which is disposed in direct heat-transferring relation to the bimetallic switch-contact 21.

Since the main running-winding 3 of the motor is adapted to carry the full running-winding current of the motor, with locked rotor, for a longer period of time than it would be possible to permit the starting-winding 4 to remain energized without the starting of the motor, it is obvious that the protective thermally responsive switching-means 20 cannot be made responsive to the current in the main winding 3, and I have accordingly adopted a protective-switch connection which was previously known for prompt-starting motors, but which has a special significance in my present combination involving a delayed-start motor. The protective-switch connection referred to involves the connection of the heating-resistance 22 in series with the starting-winding 4, while the protective switch 20, as a whole, is also in heat-responsive relation to the motor, so that the protective switch-contacts 21 will open, deenergizing the motor, either in response to an excessive predetermined temperature of the motor, or in response to a sustained energization of the starting-winding 4 for a length of time which is more than adequate for starting the motor, if it is going to start, but which is, in general, considerably less than the time-delay, prior to starting, which is introduced by the delayed-starting element 15. The protective switch-element 20, except for the application to the delay-starting combination, is substantially as shown in a Boothby Patent 1,997,673, granted April 16, 1935, and assigned to the Westinghouse Electric & Manufacturing Company.

In operation, when single-phase electrical power is applied to the line-terminals 11 and 12 of the motor from the line L, as by the closure of the line-switch 13, the main running-winding 3 is immediately energized, through the protective-switch contacts 21, and in series with the heating element 17 of the time-delay switching-device 15. The motor does not start, however, because its starting-winding 4 is not energized. After a desired time-delay, the time-delaying starting-controller 15 becomes sufficiently heated, from its heater 17, to close its switching-contacts 16 which thereupon energize the auxiliary starting-winding 4 of the motor, in series with the centrifugal switch 8 and the heater 22 of the thermostatic guard device 20. The motor then starts, and when it attains a speed which is a predetermined proportion of its final running-speed, the centrifugal switch-contacts 8 open, thereby disconnecting the starting-winding 4 and causing the motor to run on only the running-winding 3. The brief starting-period is too short to cause the heater 22 of the protective device 20 to produce sufficient heat to open the protective switch-contacts 21.

When the motor attains its normal running speed, there is a marked subsidence in the current drawn by the main running-winding 3, as distinguished from the heavy current in-rush which is characteristic of the starting-conditions with a locked, or stationary, rotor-member 6. The reduction of the current in the main winding 3, when the motor attains its running-speed, results in a considerably reduced heating of the heating-element 17 of the time-delay switching-means 15, and it is usually desirable to so design this time-delay switching-means 15 that its bimetallic contacts 16 will open soon after full running-conditions have been established in the motor, so that this time-delay device will be in the proper position to produce a delayed starting-operation (although possibly with a reduced time-delay) in case the motor should be deenergized and soon thereafter reenergized again.

The thermal protective guard-device 20 operates, to open its protective contacts 21 and to thus deenergize the motor, whenever the motor-temperature reaches a predetermined critical value, or whenever the motor is stalled, without being able to start, so that the starting-winding 4 remains energized for a time which is longer than the necessary starting-time, but which is, in general, shorter than the time-delay which is interposed by the delayed-starting device 15.

While I have described my invention in a single preferred form of embodiment, I desire it to be understood that many changes may be made by those skilled in the art, by way of substitutions, omissions, and additions, without departing from the essential spirit of my invention, particularly in its broader aspects. I desire, therefore, that the appended claims shall be accorded the broadest construction consistent with their language and the prior art.

I claim as my invention:

1. A delayed-start electric motor having a main running-winding, an auxiliary starting-winding, line-terminals adapted to be energized, at times, with electrical energy for said motor, a thermally responsive switch located in direct heat-receiving relation to said motor and also having an electrical heating-element of its own, the operating-temperature to which said thermally responsive switch responds being such that the time required by the electrical heating-element to heat the switch to said temperature is materially affected by the motor-temperature of the initiation of the energization of said heating-element, and means responsive to the initial energization of said running-winding for initiating the energization of said heating-element, said thermally responsive switch having time-delay switching-contacts so associated with said auxiliary starting-winding as to cause the latter to become effectively energized, for starting the motor, only after said time-delay switching-contacts have been actuated.

2. A delayed-start electric motor having a main running-winding, an auxiliary starting-winding, line-terminals adapted to be energized, at times, with electrical energy for said motor, a thermally responsive switch located in direct heat-receiving relation to said motor and also having an electrical heating-element of its own, the operating-temperature to which said thermally responsive switch responds being such that the time required by the electrical heating-element to heat the switch to said temperature is materially affected by the motor-temperature at the initiation of the energization of said heating-element, and means for energizing said heating-element in series-circuit relation to said running-winding, said thermally responsive switch having time-delay switching-contacts so associated with said auxiliary starting-winding as to cause the latter to become effectively energized, for starting the motor, only after said time-delay switching-contacts have been actuated.

3. A delayed-start electric motor having a main running-winding, an auxiliary starting-winding, line-terminals adapted to be energized, at times, with electrical energy for said motor, a thermally responsive switch located in direct heat-receiving relation to said motor and also having an electrical heating-element of its own, the operating-temperature to which said thermally responsive switch responds being such that the time required by the electrical heating-element to heat the switch to said temperature is materially affected by the motor-temperature at the initiation of the energization of said heating-element, and means responsive to the initial energization of said running-winding for initiating the energization of said heating-element, said thermally responsive switch having normally open contacts serially associated with said auxiliary starting winding, said normally open contacts being closed only after a time-delay dependent upon the attainment of a predetermined degree of heat.

4. A delayed-start electric motor having a main running-winding, an auxiliary starting-winding, line-terminals adapted to be energized, at times, with electrical energy for said motor, a thermally responsive switch located in direct heat-receiving relation to said motor and also having an electrical heating-element of its own, the operating-temperature to which said thermally responsive switch responds being such that the time required by the electrical heating-element to heat the switch to said temperature is materially affected by the motor-temperature at the initation of the energization of said heating-element, and means for energizing said heating-element in series-circuit relation to said running-winding, said thermally responsive switch having normally open contacts serially associated with said auxiliary starting-winding, said normally open contacts being closed only after a time-delay dependent upon the attainment of a predetermined degree of heat.

5. A delayed-start electric motor having a main running-winding, an auxiliary starting-winding, line-terminals adapted to be energized, at times, with electrical energy for said motor, a thermally responsive switch located in direct heat-receiving relation to said motor and also having an electrical heating-element of its own, the operating-temperature to which said thermally responsive switch responds being such that the time required by the electrical heating-element to heat the switch to said temperature is materially affected by the motor-temperature at the initiation of the energization of said heating-element, means responsive to the initial energization of said running-winding for initiating the energization of said heating-element, said thermally responsive switch having time-delay switching-contacts so associated with said auxiliary starting-winding as to cause the latter to become effectively energized, for starting the motor, only after said time-delay switching-contacts have been actuated, start-run switching-means, operable after the motor has started, for substantially deenergizing said auxiliary starting-winding, and protective time-delay circuit-interrupting means, operable when the starting-winding remains energized for a predetermined time which is shorter than the time-delay of said thermally responsive switch, for substantially deenergizing both of the windings of the motor.

6. A delayed-start electric motor having a main running-winding, an auxiliary starting-winding, line-terminals adapted to be energized, at times, with electrical energy for said motor, a thermally responsive switch located in direct heat-receiving relation to said motor and also having an electrical heating-element of its own, the operating-temperature to which said thermally responsive switch responds being such that the time required by the electrical heating-element to heat the switch to said temperature is materially affected by the motor-temperature at the initiation of the energization of said heating-element, means for energizing said heating-element in series-circuit relation to said running-winding, said thermally responsive switch having normally open contacts serially associated with said auxiliary starting-winding, said normally open contacts being closed only after a time-delay dependent upon the attainment of a predetermined degree of heat, start-run switching-means, operable after the motor has started, for substantially denergizing said auxiliary starting-winding, and protective time-delay circuit-interrupting means, operable when the starting-winding remains energized for a predetermined time which is shorter than the time-delay of said thermally responsive switch, for substantially deenergizing both of the windings of the motor.

7. A delayed-start electric motor having a main running-winding, an auxiliary starting-winding, line-terminals adapted to be energized, at times, with electrical energy for said motor, a thermally responsive delayed-start switching-means mounted in heat-exchanging relation to the motor and having means for also heating the same in response to a current which flows at a time when the main running-winding is energized and the auxiliary starting-winding is in effect substantially deenergized, said delayed-start switching-means being so disposed and arranged that when electrical energy is first applied to the line-terminals, the main running-winding is energized and the auxiliary starting-winding is in effect substantially deenergized, said delayed-start switching-means being operative, in response to its heating, to thereafter cause the auxiliary starting-winding to be effectively energized for starting the motor, the operating-temperature to which said delayed-start switching-means responds being such that the time required by the current-responsive heating-means to heat the switch to said temperature is materially affected by the motor-temperature at the initiation of the energization of said current-responsive heating means, start-run switching-means, operable after the motor has started, for substantially deenergizing said auxiliary starting-winding, and protective time-delay circuit-interrupting means, operable when the starting-winding remains energized for a predetermined time which is shorter, in general, than the time-delay of said delayed-start switching-means, for subsequently deenergizing the motor.

8. A delayed-start electric motor having a main running-winding, an auxiliary starting-winding, line-terminals adapted to be energized, at times, with electrical energy for said motor, a thermally responsive delayed-start switching-means mounted in heat-exchanging relation to the motor and having means for also heating the same in response to a current which flows at a time when the main running-winding is energized and the auxiliary starting-winding is in effect substantially deenergized, said delayed-start switching-means being so disposed and arranged that when electrical energy is first applied to the line-terminals, the main running-winding is energized and the auxiliary starting-winding is in effect substantially deenergized, said delayed-start switching-means being operative, in response to its heating, to thereafter cause the auxiliary starting-winding to be effectively energized for starting the motor, the operating-temperature to which said delayed-start switching-means responds being such that the time required by the current-responsive heating-means to heat the switch to said temperature is materially affected by the motor-temperature at the initiation of the energization of said current-responsive heating means, start-run switching means, operable after the motor has started, for substantially deenergizing said auxiliary starting-winding, and a thermally responsive protective switching-means mounted in heat-exchanging relation to the motor and having means for also heating the same in response to a current which flows substantially only at a time when the auxiliary starting-winding is effectively energized, for substantially deenergizing the motor after a time-delay which is shorter, in general, than the time-delay of said delayed-start switching-means.

CYRIL G. VEINOTT.